United States Patent [19]

Nilsson et al.

[11] Patent Number: 5,940,130
[45] Date of Patent: *Aug. 17, 1999

[54] VIDEO TRANSCODER WITH BY-PASS TRANSFER OF EXTRACTED MOTION COMPENSATION DATA

[75] Inventors: Michael Erling Nilsson; David Geoffrey Morrison, both of Suffolk; Mohammed Granbari, Essex, all of United Kingdom

[73] Assignee: British Telecommunications public limited company, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/530,329

[22] PCT Filed: Apr. 21, 1995

[86] PCT No.: PCT/GB95/00906

§ 371 Date: Oct. 4, 1995

§ 102(e) Date: Oct. 4, 1995

[87] PCT Pub. No.: WO95/29561

PCT Pub. Date: Nov. 2, 1995

Related U.S. Application Data

[63] Continuation-in-part of application No. 08/263,348, Jun. 21, 1994, abandoned.

[30] Foreign Application Priority Data

Apr. 21, 1994 [EP] European Pat. Off. .............. 94302829
Jul. 19, 1994 [GB] United Kingdom ................... 9414579

[51] Int. Cl.⁶ ................................................. H04N 7/32
[52] U.S. Cl. ............................................................ 348/416
[58] Field of Search ..................................... 348/416, 415, 348/409, 407, 405, 403, 402, 401, 400, 390, 384; 382/233, 238, 236, 251, 232; H04N 7/13, 7/137

[56] References Cited

U.S. PATENT DOCUMENTS 5,072,295 12/1991 Murakami et al. ..................... 348/405
5,228,028 7/1993 Cucchi et al. .......................... 348/402
5,278,646 1/1994 Civanlar ................................ 348/415
5,291,284 3/1994 Carr et al. .............................. 348/415
5,293,229 3/1994 Iu ........................................... 348/415
5,367,336 11/1994 Kustka .................................... 348/416
5,446,495 8/1995 Tourtier et al. ........................ 348/398
5,537,440 7/1996 Eyuboglu et al. ...................... 348/405
5,544,266 8/1996 Koppelmans et al. ................. 382/238

OTHER PUBLICATIONS

Communications of the ACM, vol. 34, No. 4, Apr. 1, 1991, New York, USA, pp. 103–112; M. Leibhold et al: "Toward an Open Environment for Digital Video".
Patent Abstracts of Japan, vol. 16, No. 520 (P–1444), Oct. 26, 1992 & JP–A–04 192 080 (Mitsubishi Electric Corp.) Jul. 10, 1992 (Abstract).
Patent Abstracts of Japan, vol. 7, No. 10 (P–18) Jan. 14, 1983 & JP–A–57 166 640 (Hitachi Seisakusho KK) Oct. 14, 1982 (Abstract).
17th International Television Symposium, Broadcast Sessions, Jun. 13, 1991, Montreux, CH, pp. 552–558; B. Pank: "Picture conversion of HD Graphics".
18th International Television Symposium, Broadcast Sessions, Jun. 10, 1993, pp. 432–447; David et al: "A Third Generation Algorithm For Use in High Definition Frame Rate Convertors".

Primary Examiner—Bryan Tung
Attorney, Agent, or Firm—Nixon & Vanderhye P.C.

[57] ABSTRACT

A transcoder for the conversion of video signals between a first and a second coding scheme employing motion compensation comprises a decoder (28) for decoding a received data stream encoded according to a first coding scheme and an encoder (30) for encoding a data stream from the decoder into a data stream according to a second coding scheme. The decoder (28) extracts motion vectors from the received data stream and passes them (42) to the data stream of the encoder, so avoiding the recalculation of the motion vectors. Drift compensation means (52–64; 70–78) may be provided to compensate for any resulting drift after a picture frame.

28 Claims, 6 Drawing Sheets

VIDEO TRANSCODER WITH BY-PASS TRANSFER OF EXTRACTED MOTION COMPENSATION DATA

CROSS-REFERENCE TO RELATED APPLICATION

This application is a continuation-in-part of commonly assigned application Ser. No. 08/263,348 filed Jun. 21, 1994, now abandoned.

BACKGROUND OF THE INVENTION

1. Field of the Invention

This invention relates to transcoders for the conversion of signals between a first and a second coding scheme. The invention is particularly suitable for converting video signals.

2. Related Art

There are many occasions when it is necessary to transmit moving picture television over long distances via a transmission link. Broadcast quality television requires in excess of 100 Mbit/s when transmitted in digital form which is expensive to transmit and requires links of high bandwidth. An acceptable degree of degradation in the picture quality can be introduced to reduce the information content being transmitted. Additionally or alternatively, compression coding techniques may be used which take advantage of the high degree of spatial and temporal redundancies in the video signals being encoded. So, for example, for video conferencing applications compression down to a bit rate of a few hundred kbit/s is possible whereas videophone-quality pictures including sound can be compressed down to only 64 bit/s, equivalent to a single telephone circuit.

Redundancy reduction techniques assume there is spatial and/or temporal correlation between neighbouring pixels or blocks of pixels. The details of correlation are encoded as well as the differences between the assumptions and the actual pixels or blocks. Typically each frame of an image to be coded comprises an array of picture elements (pixels) which are divided into blocks of N×M pixels.

Predictive coding exploits the assumption that a value within a frame is related to some neighbouring values, in the same or a different frame, and the value may therefore be calculated at the receiver instead of being transmitted. It is only necessary to transmit the prediction error arising from such an assumption. For instance the first pixel of a frame may be transmitted exactly whilst each subsequent pixel is transmitted as a difference from its predecessor. In more complex schemes the prediction may be a combination of a number of pixels.

Transform coding exploits the correlation of pixel magnitudes within a frame by transforming the magnitudes into another set of values, many of which are relatively small and can therefore be coded using fewer bits. The most common form of transform coding uses the Discrete Cosine Transform (DCT). A block of N×M pixels is transformed into an array of N×M transform coefficients. The resulting array of coefficients is then quantised by dividing each coefficient by a variable quantisation factor. The quantised coefficients may be coded in variable length code, for instance a Huffman code.

Another coding technique is motion compensation in which a picture is divided into blocks of pixels and each block of the current frame is compared with the corresponding block of a reference frame, which may be a previous or a subsequent frame, and with regions shifted in position from that block, and that region of the reference frame which the block most closely resembles is identified.

The vector difference in position between the identified region and the block in question is termed a motion vector and is used to shift the identified region of the reference frame into the position of the relevant block in the current frame. Motion vectors are generated for all the blocks of the current frame and these are used to derive a predicted frame from the reference frame. The differences between the current and predicted frame are, on average, smaller than those between the current and reference frame and can be encoded using a lower bit rate. A decoder which already has the reference frame stored can thus reproduce the current frame using the motion vectors and the difference values. A signal may be coded using any of the aforementioned coding techniques, either separately or in combination.

There are circumstances when it is desirable to employ a transcoder which can accept a received data stream encoded according to a first scheme and output an encoded data stream encoded according to a second coding scheme. If one had a decoder which operated according to a second coding scheme then such a transcoder would allow reception of the transmission encoded according to the first coding scheme without modifying the original encoder. For example, a transcoder could be used to convert a 64 kbit/s video signal, conforming to ITU-T standard H.261, from an ISDN video terminal to a 32 kbit/s signal for transmission over a Digital European Cordless telephone (DECT) network.

Known transcoders decode video encoded according to a first coding scheme into an uncompressed video signal which is then encoded by an encoder according to the second coding scheme to output a new compressed data stream. Thus, a full decoding operation is carried out to reconstitute the original video signal and then this video signal is encoded to provide a new coded data stream according to the second coding scheme. For coding methods involving motion compensation, new motion vectors have to be generated for the signal encoded according to the new format and this accounts for a large proportion of the processing time of conventional transcoders.

SUMMARY OF THE INVENTION

According to the present invention there is provided a transcoder comprising a decoder for decoding a video signal encoded according to a first coding scheme employing motion compensation techniques and an encoder for encoding the decoded video signal according to a second coding scheme characterised in that the decoder extracts the motion compensation information from the video signal and transfers the motion compensation information to the encoded video signal output from the encoder.

The motion compensation information may be transferred unmodified from the decoder to the output of the encoder, thereby reducing the processing required in the transcoder. Alternatively, the motion compensation information may be modified in accordance with the compression ratios of the two coding schemes.

The decoder and encoder of the transcoder may operate with a non-constant clock rate and thus the capacity of the buffers in the main data path can be reduced over conventional transcoders.

It is not necessary for the motion compensation block size of the two coding schemes to be the same. If the resolution of the two schemes is the same, then the motion vectors can be transferred unchanged if the block size is changed, but some will need to be duplicated or discarded as appropriate.

For example, if the motion compensation block size of the first coding scheme is 16×16 pixels and that of the second coding scheme is 8×8, then the motion vector for one 16×16 block can be used for the four co-sited 8×8 blocks of the second scheme. If the block size of the first coding scheme is 8×8 pixels and that of the second coding scheme is 16×16 pixels, there is an excess of motion vectors for the second coding scheme. Thus, for instance, an average of the four relevant motion vectors may be calculated and used.

If the resolution of the input picture is different from the resolution of the output picture resolution, the vectors may be scaled appropriately. For, example, if the motion compensation blocks of both coding schemes are 16×16 pixels, the input resolution is 352×288 pixels and the output resolution is 176×144 pixels, the vectors input to the transcoder are divided by two before being transferred to the encoded video signal. The computational complexity is small compared to conventional motion vector estimation.

When predictive coding is used, discrepancies may arise between the data transmitted from the original encoder and that decoded at the destination decoder, owing to transmission errors. Decoded images formed at the final decoder will therefore contain artifacts which will increase with time unless non-predictive coding is occasionally employed to restore the integrity of the decoded signal. However, the original encoder may not employ non-predictive coding sufficiently often for an acceptable decoded image to be constructed at the destination encoder if a transcoder is employed of which the original encoder is not aware. This will result in a drift between the video signal received by the transcoder and that output from the transcoder.

Advantageously therefore the transcoder includes drift compensation means. The drift compensation means preferably comprises means for forming a signal representing the drift between the output of the decoder and that of the encoder, means for storing the drift signal and means for adding the drift signal to the output of the decoder.

In a preferred embodiment, the drift signal is added to the output of the decoder after a delay, preferably of one picture period. Such an arrangement compensates for the drift without introducing a delay in the encoded signal.

The drift signal may be subjected to a threshold such that the drift signal is added to the output of the decoder only if it exceeds such a threshold.

Preferably the decoder includes an inverse quantiser and the encoder includes a quantiser of different quantisation step size from that of the inverse quantiser.

According to a second aspect of the invention a transcoder comprising a decoder for decoding a signal encoded according to a first coding scheme and an encoder for encoding the decoded signal according to a second coding scheme includes compensation means to compensate for the drift between the output from the decoder and the input to the encoder.

BRIEF DESCRIPTION OF THE DRAWINGS

The invention will now be further described by way of example only with reference to the accompanying drawings in which.

DETAILED DESCRIPTION OF EXEMPLARY EMBODIMENTS

Figure 1:
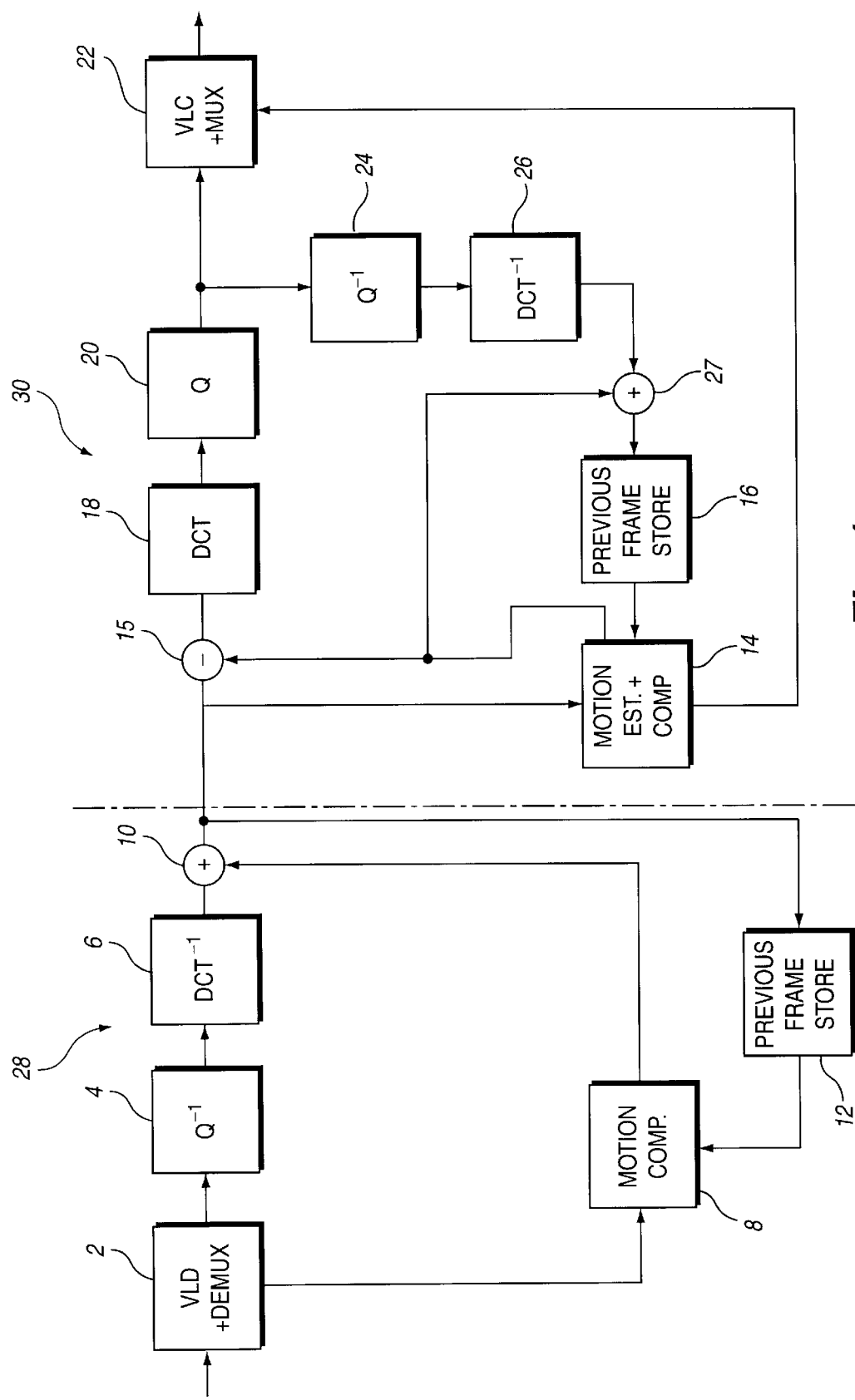
FIG. 1 shows a schematic drawing of a known transcoder.

A known transcoder as shown in FIG. 1 can be perceived as comprising a decoder 28 and an encoder 30. The decoder 28 comprises a variable length decoder 2 which receives a video signal encoded according to a first coding scheme employing motion compensation and DCT coding of the difference signals, say a 64 kbit/s signal conforming to CCITT H.261 standard. The decoder 2 detects and converts the received data into quantised DCT coefficients, quantisation indexes and motion vectors. The DCT coefficients are passed through an inverse quantiser 4 and an inverse DCT processor 6 which converts the DCT coefficients into pixel difference values.

The motion vectors are passed to a motion compensator 8 which calculates the address of the prediction pixel block in the previous frame. This block is then retrieved from a previous frame store 12 and added in adder 10 to the output of the inverse DCT processor 6 to produce a decoded data stream for the current block. The decoded data stream is stored in the previous frame store 12 as a reference for the next frame.

The decoded data stream also passes into the encoder 30 of the transcoder and a motion estimator 14 searches a previous frame buffer 16 for an offset block of pixels that closely resembles the current block. The motion vector for this best-match block is calculated and the block retrieved from the previous frame buffer 16 and subtracted by means 15 from the decoded data stream to form a difference signal. This difference signal for the current block is then transformed into the frequency domain by a DCT processor 18. The frequency coefficients thus generated are then quantised in a quantiser 20 having a step size suitable for the bit rate desired at the transcoder's output. A variable length coder 22 converts the output of the quantiser 20 and the motion vectors from the motion estimator 14 into variable length codes and then outputs the data in the new format.

The encoder 30 of the transcoder also includes a local decoder which comprises an inverse quantiser 24 and an inverse DCT processor 26. The output of the inverse DCT processor 26 and the motion estimator and compensator 14 are input to an adder 27 to produce an updated predicted frame which is stored in the previous frame store 16.

Figure 2:
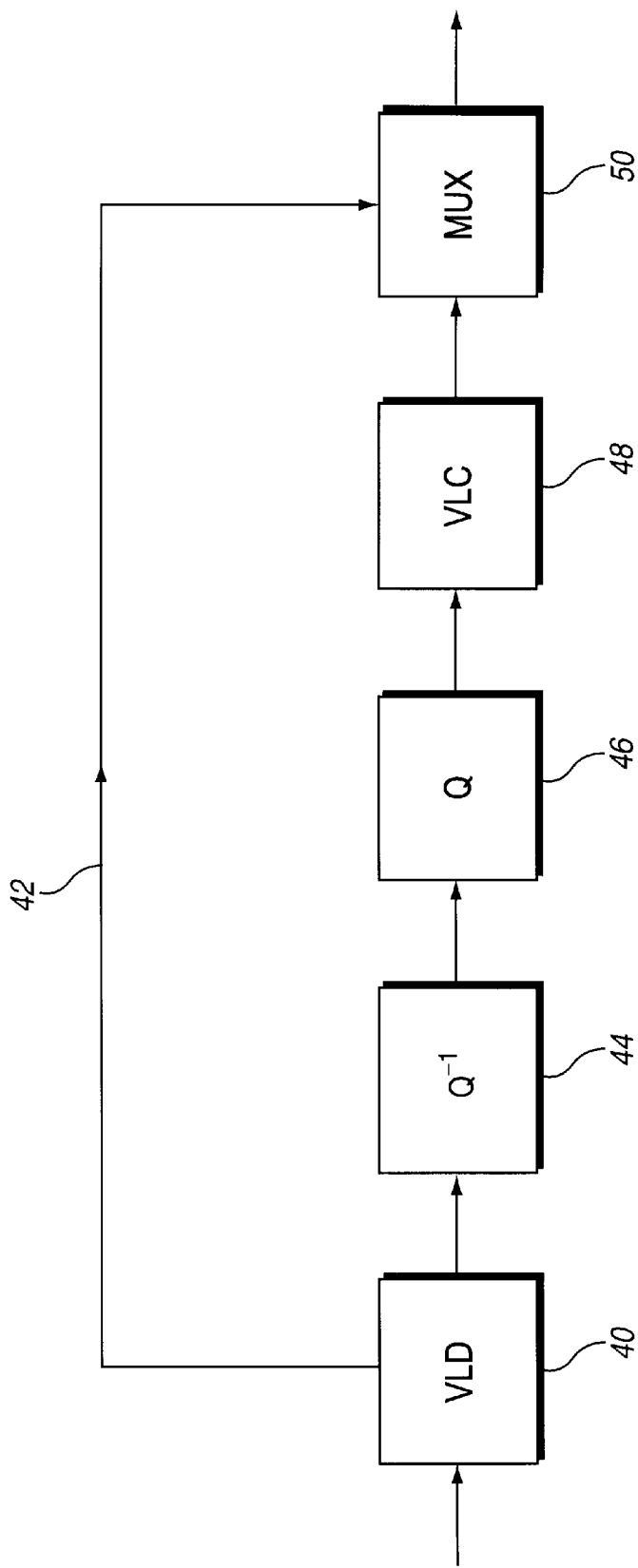
FIG. 2 shows a schematic drawing of a transcoder according to one embodiment of the invention.

A transcoder according to one embodiment of the invention is shown in FIG. 2. The transcoder comprises a variable length decoder 40, for decoding incoming signals encoded according to a first format, for instance in accordance with CCITT standard H.261 at 64 kbit/s. The decoder 40 detects and converts the variable length codes into DCT coefficients and motion vectors and the latter are passed through the transcoder without any further processing as indicated by numeral 42. Such a transcoder is suitable for use with coding schemes having the same picture resolution, transform block size and motion compensation block size. The DCT coefficients are then input to an inverse quantiser 44 and the resulting data requantised by quantiser 46 with a different quantisation step size appropriate to the output format, for instance 32 kbit/s. The new DCT coefficients are encoded by a variable length coder 48 and then recombined with the unmodified motion vectors 42 in a multiplexer 50.

Thus, the decoding is performed on the coded data directly from the transmission system without buffering and there is very little delay up to the output of the multiplexer 50 because the processes have low latency. The only buffer that may be necessary may be between the multiplexer and the output of the transcoder and serves the same two functions as in a normal encoder; namely smoothing the coded data and providing additional control of the quantiser 46. However, the smoothing required is only to cover any localised variations in output rate due to the discrete nature of the quantiser 46, so this buffer (not shown) and its delay can be an order of magnitude or more smaller than those in conventional encoders.

Figure 3:
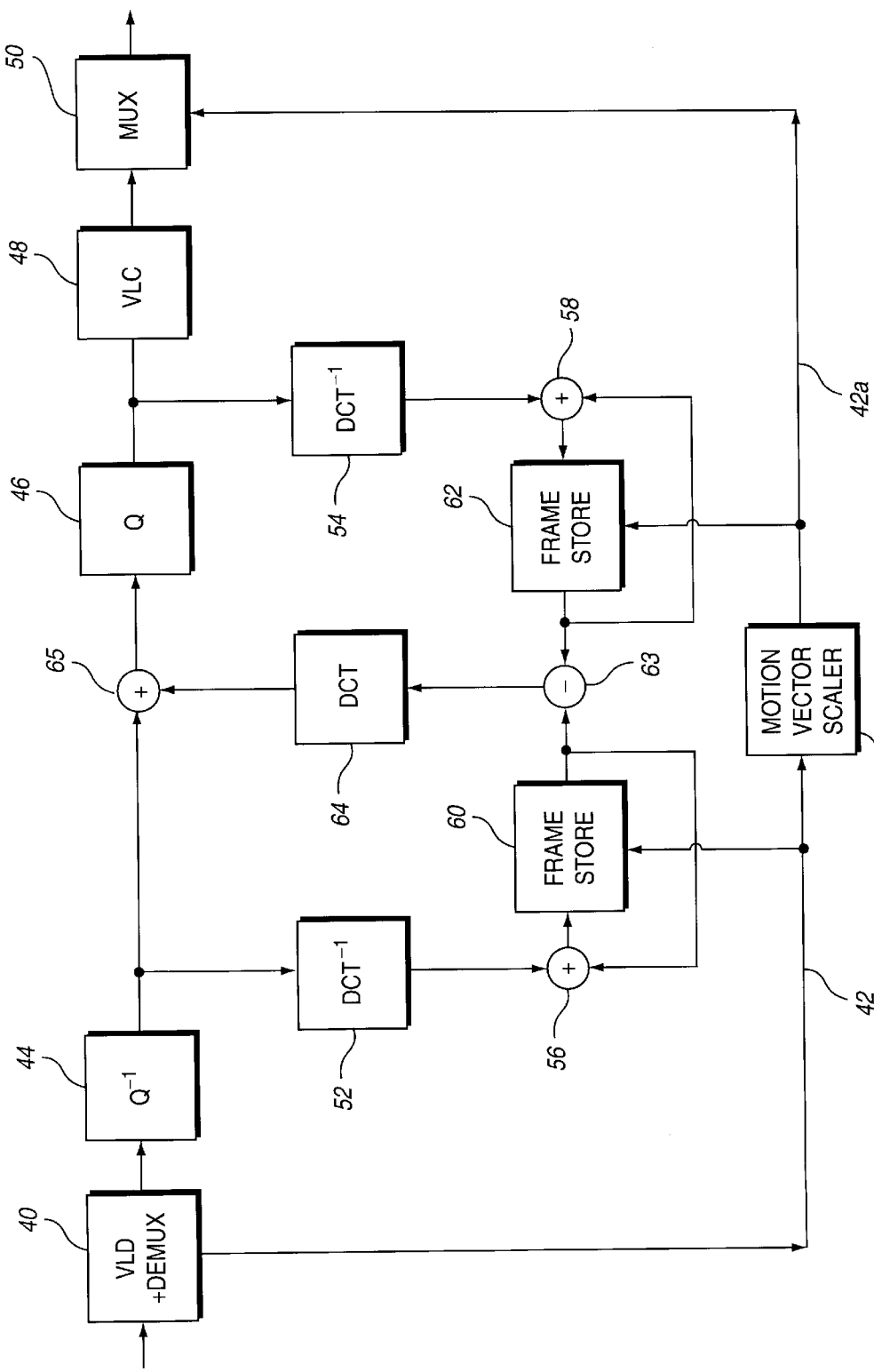
FIG. 3 shows a schematic drawing of a transcoder according to a second embodiment of the invention.

FIG. 3 shows a transcoder according to a second embodiment of the invention which is suitable for use with coding schemes having different picture resolutions, for instance a first coding scheme having a picture resolution of, say, 388×288 pixels and a second coding scheme having a picture resolution of, say, 176×144 pixels. A motion vector scalar 45 scales the incoming motion vectors 42 by a factor of 0.5 and the resulting motion vectors 42a are multiplexed with the output of the VLC, as described with reference to FIG. 2.

The quantiser 46 introduces quantisation error into the output of the transcoder which is not foreseen by the original encoder. This error or drift will build up over time unless this drift is compensated for. According to a second aspect of the invention a correction is applied within the transcoder itself, with the straight through path of the motion vectors 42 unchanged. The concept is to requantise the transform coefficients as quickly as possible, accept that mistracking will be introduced between the original encoder (not shown) and the eventual decoder (not shown), dispatch the coded data to the eventual decoder, compute the error being introduced and attempt to correct it at the next opportunity. Of course, at that time a new error will be introduced by requantising the then current coefficients. Also, each correction can rarely be perfect given the discrete natures of the two quantising laws. Thus the transcoder is continuously attempting to "catch up" with previous errors it caused.

The transcoder according to FIG. 3 includes such drift compensation means. The output from the inverse quantiser 44 is fed to an inverse DCT processor 52 and the output of quantiser 46 is fed to an inverse DCT processor 54. The resulting pixel difference values are passed, via adders 56,58 respectively, into frame stores 60,62 respectively, the contents of which are compensated by the original motion vectors 42 and the scaled motion vectors 42a respectively. After a delay of one frame the contents of the frame stores 60,62 are subtracted by subtractor 63 to form a drift signal between the received data (stored in frame store 60) and the transmitted data (stored in frame store 62). This drift signal is then converted back into the frequency domain by a DCT processor 64 and added to the output of the inverse quantiser 44 by adder 65. The drift is thus compensated for after a delay of one frame. The motion compensated contents of the frame stores 60,62 also form the second inputs to the adders 56,58 respectively.

Figure 4:
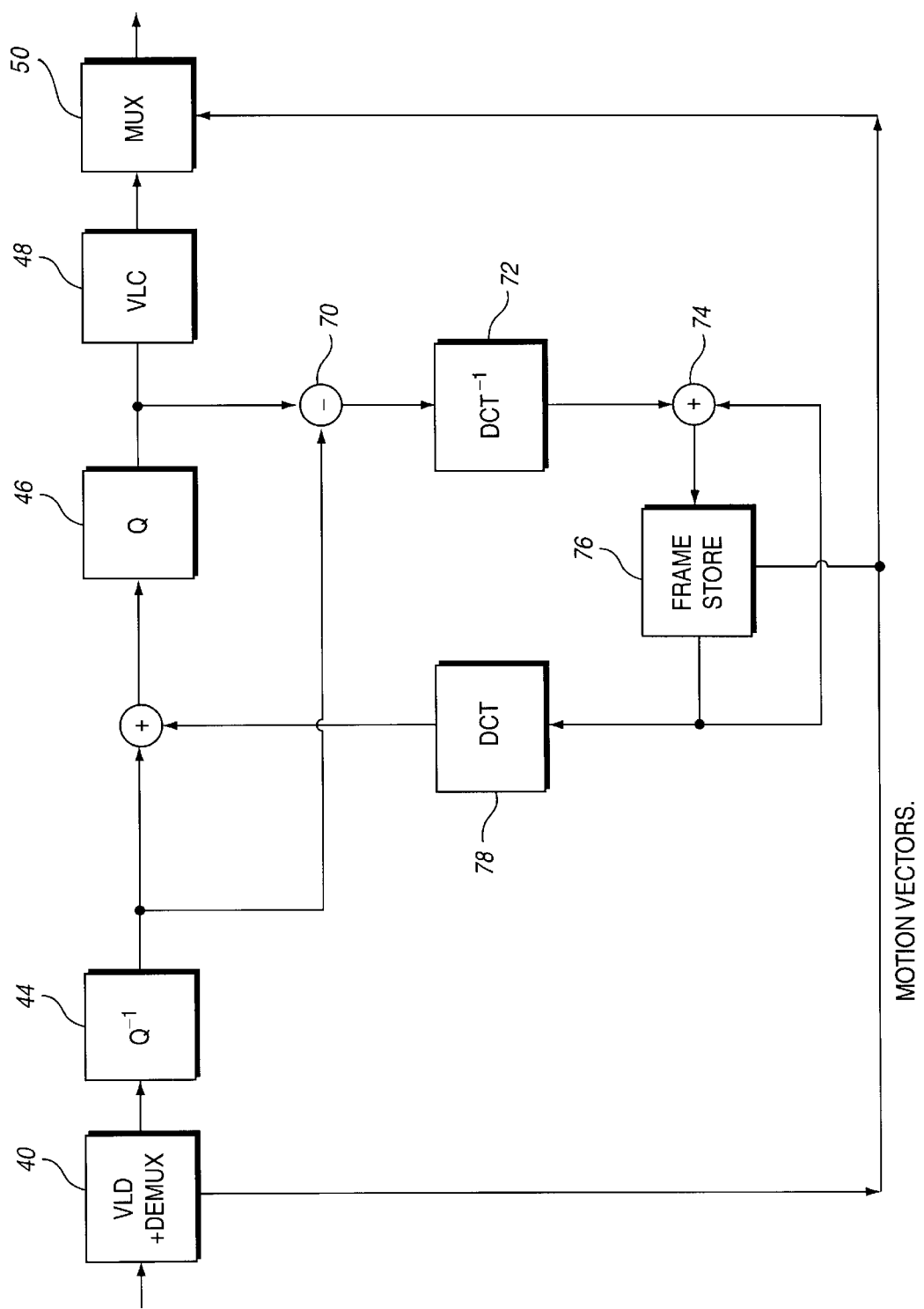
FIG. 4 shows a schematic drawing of a transcoder according to a third embodiment of the invention.

The error or drift is obtained by fully decoding to the pel domain both the original coded data and the bit rate reduced version and forming the difference. This is then transformed and added back into the main path just before the quantiser. Note that the reconstructed video signals used to form the error are taken from the outputs of the picture stores and are thus one picture late with respect to the main path. FIG. 4 shows an alternative embodiment of a transcoder according to the invention, which is suitable for coding schemes having the same picture resolution, transform block size and motion compensation block size. Similar components are indicated by the same reference numerals. In this embodiment the drift signal is formed in the frequency domain as opposed to the pixel domain. The outputs of the inverse quantiser 44 and the quantiser 46 are input to a subtractor 70 to form a drift signal between the DCT coefficients of the received and transmitted signal. This drift signal is then converted to the pixel domain by inverse DCT processor 72. The output from the inverse DCT processor 72 forms one input to an adder 74, the output of which is passed to a frame store 76. As before, after a delay of one frame, the contents of the frame store are transformed back into the frequency domain by a DCT processor 78. The contents of the frame store also form the second input to the adder 74.

Figure 5:
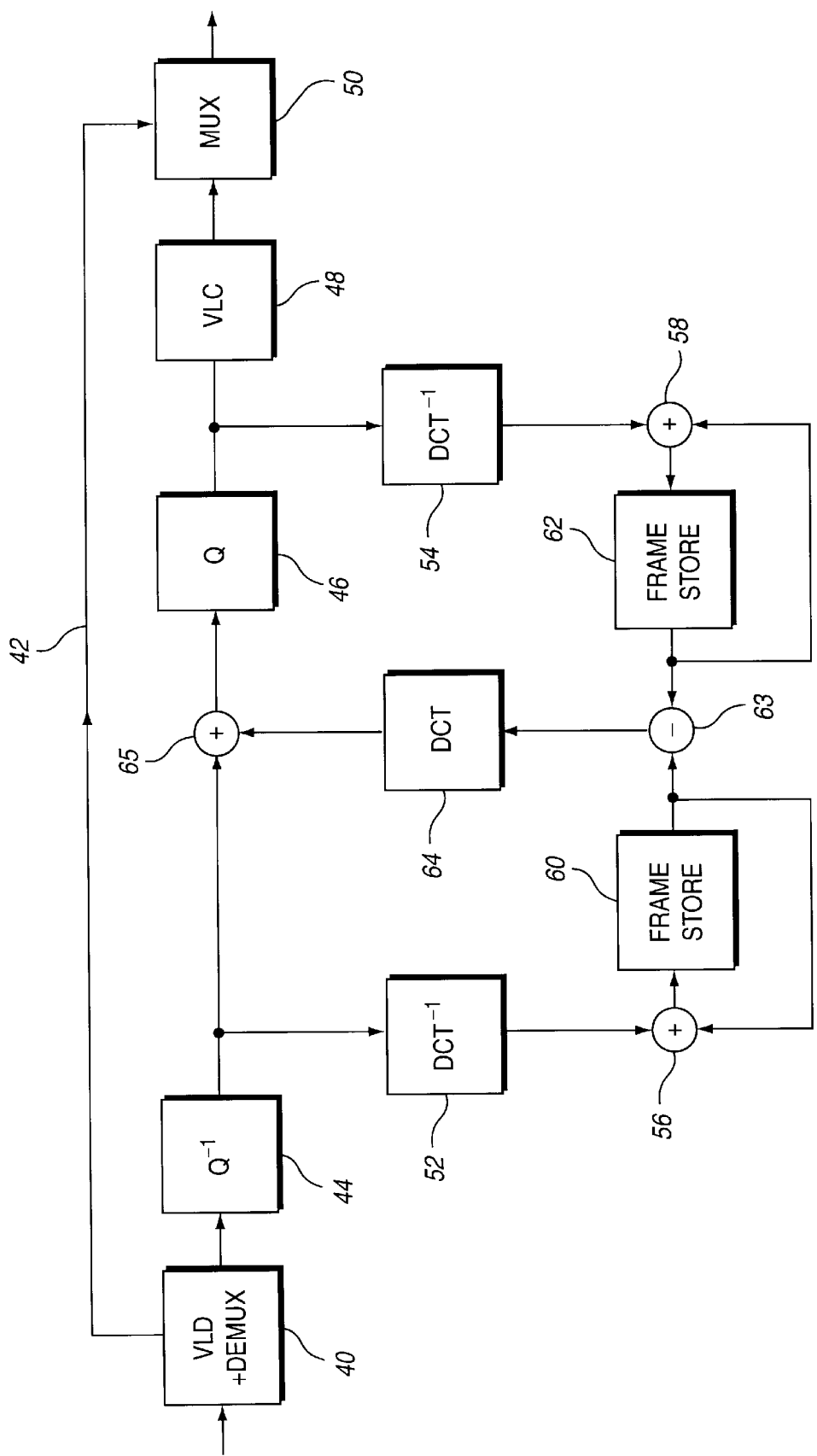
FIG. 5 shows a schematic drawing of a transcoder according to a further embodiment of the invention.

FIG. 5 shows a further embodiment of a transcoder according to the invention which is suitable for use with coding schemes that do not employ motion compensation techniques. Such a transcoder includes drift compensation means and is suitable for use with video signals as well as other signals. As before, similar components are indicated by the same reference numbers. The transcoder of FIG. 5 operates in a manner similar to that shown in FIG. 3. When no motion compensation is involved, the drift compensation may be calculated fully in the transform domain.

Figure 6:
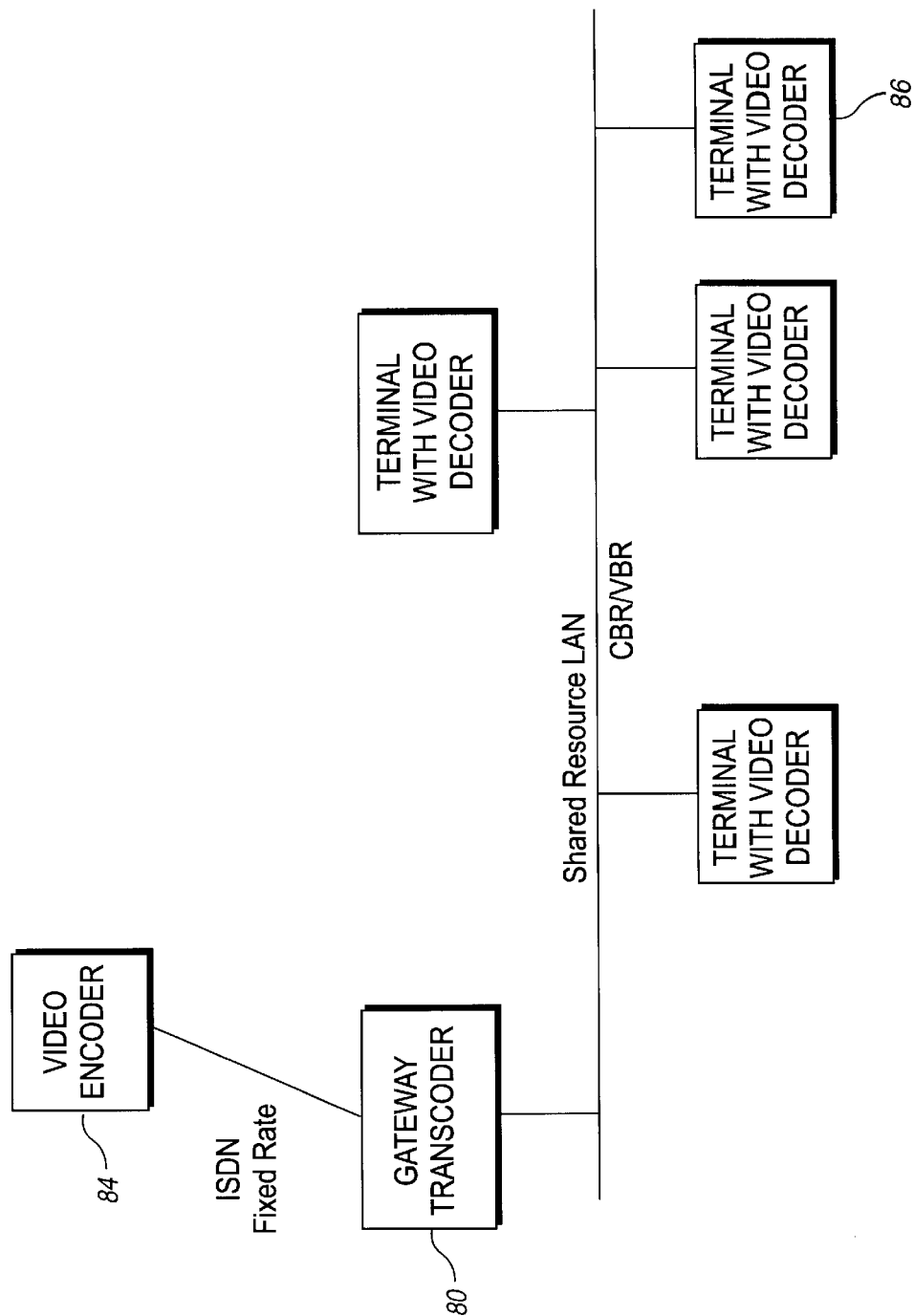
FIG. 6 shows an example of an application of a transcoder according to the invention.

The invention functions equally well in applications where the reduced rate is not constant, so called Variable Bit Rate (VBR) systems. An example with special relevance to packet video is a connection between a terminal connected to an Intergrated Services Digital Network (ISDN) and another on a Local Area Network (LAN), as shown in FIG. 6. Compressed video from the ISDN terminal at a constant rate is transferred unchanged to the LAN by a gateway transcoder 80 when the LAN traffic is sufficiently low. However, during periods of congestion on the LAN, the gateway transcoder 80 is able to reduce the video data rate required on the LAN. No control mechanism back to the original encoder 84 is necessary. Thus the potential problems of transmission delay time to, and reaction time by, a distant encoder which might be anywhere in the world do not arise. Furthermore the transcoder is able to make rate changes of almost arbitrary size and at arbitrary instants compared to, for example, the discrete 64kbit/s or so steps at 20 millisecond boundaries possible in H.320/H.221.

Another example of fixed to variable bit rate conversion could arise in networks such as for mobile applications, in which Automatic Repeat reQuest (ARQ) mechanisms dynamically reduce the effective throughput rate.

In the above examples of variable bit rate applications the transcoder is normally inactive with the quantisation index of the inverse quantiser 44 and the quantiser 46 being equal. The picture quality therefore is not impaired by the transcoder. The bit rate reduction of the transcoder 80 is only invoked for comparatively short periods to mitigate against a transmission problem. Any temporary drop of picture quality is much more preferable than the usual effects of data loss on a predictive algorithm.

A transcoder according to the invention is also suitable for use for converting constant bit rate data from a terminal, for instance the terminal 86 of the LAN, into VBR data for transmission via an ATM network.

The coded data from the transcoder of the invention may be transmitted to a decoder that operates at the transmitted data rate or to a decoder that operates at a higher data rate, e.g. that of the original encoder.

We claim:

1. A transcoder comprising:
    a decoder for decoding a video signal encoded according to a first coding scheme employing motion compensation techniques, and an encoder for encoding the decoded video signal according to a second coding scheme, the decoder including means that extracts the motion compensation information from the video signal and a motion compensation information modifier to modify the motion compensation information in accordance with relative properties of the coding schemes, said modifier transferring the motion compensation information to the encoded video signal output from the encoder.

2. A transcoder as in claim 1 further comprising drift compensation means.

3. A transcoder as in claim 2 wherein the drift compensation means comprises:

means for forming a signal representing the drift between the output of the decoder and that of the encoder, means for storing the drift signal, and means for adding the drift signal to the output of the decoder.

4. A transcoder as in claim 3 wherein the drift signal is added to the output of the decoder after a delay.

5. A transcoder as in claim 4 wherein the drift signal is added to the output of the decoder after a delay of one picture period.

6. A transcoder as in claim 3 wherein the drift signal is added to the output of the decoder only if the drift signal exceeds a threshold.

7. A transcoder as in claim 1 wherein the decoder includes an inverse quantiser and the encoder includes a quantiser of different quantisation step size from that of the inverse quantiser.

8. A transcoder as in claim 1, wherein said modifier modifies the motion compensation information in accordance with a compression ratio of the two coding schemes.

9. A transcoder as in claim 1 in which:

the first coding scheme encodes the signal according to a first resolution, and the second coding scheme encodes the signal according to a second resolution, and the modifier scales the motion compensation information accordingly.

10. A transcoder comprising:

a decoder for decoding a video signal encoded according to a first coding scheme employing motion compensation techniques, an encoder for encoding the decoded video signal according to a second coding scheme, the decoder extracting the motion compensation information from the video signal and transferring the motion compensation information to the encoded video signal output from the encoder, and drift compensation means including means for forming a signal representing the drift between the output of the decoder and that of the encoder, means for storing the drift signal and means for adding the drift signal to the output of the decoder, wherein the drift signal is added to the output of the decoder after a delay of one picture period, and wherein the drift signal forming means forms the drift signal in the frequency domain, and the transcoder further includes means for converting the drift signal into the pixel domain and means for transforming the drift signal back to the frequency domain.

11. A transcoder comprising:

a decoder for decoding a video signal encoded according to a first coding scheme employing motion compensation techniques, an encoder for encoding the decoded video signal according to a second coding scheme, the decoder extracting the motion compensation information from the video signal and transferring the motion compensation information to the encoded video signal output from the encoder, and drift compensation means including means for forming a signal representing the drift between the output of the decoder and that of the encoder, means for storing the drift signal and means for adding the drift signal to the output of the decoder, wherein the drift signal is added to the output of the decoder after a delay of one picture period, and wherein the drift compensation means comprises means for storing the output of the decoder and encoder in the pixel domain and for forming the drift signal in the pixel domain and means for transforming the drift signal back to the frequency domain.

12. A transcoding method comprising:

decoding a video signal encoded according to a first coding scheme employing motion compensation techniques;

encoding the decoded video signal according to a second coding scheme;

extracting the motion compensation information from the video signal;

modifying the motion compensation information in accordance with relative properties of the coding schemes; and transferring the motion compensation information to the encoded video signal output from the encoder.

13. A method as in claim 12 further comprising compensating for drift.

14. A method as in claim 13 wherein the drift compensation step comprises:

forming a signal representing the drift between the output of the decoding step and that of the encoding step, storing the drift signal, and adding the drift signal to the output of the decoding step.

15. A method as in claim 14 wherein the drift signal is added to the output of the decoding step after a delay.

16. A method as in claim 15 wherein the drift signal is added to the output of the decoding step after a delay of one picture period.

17. A method as in claim 15 wherein the drift signal is formed in the frequency domain, and is then converted into the pixel domain and then transformed back to the frequency domain.

18. A method as in claim 15 wherein the drift compensation comprises:

storing the output of the decoding step and of the encoding step in the pixel domain, forming the drift signal in the pixel domain, and transforming the drift signal back to the frequency domain.

19. A method as in claim 14 wherein the drift signal is added to the output of the decoding step only if the drift signal exceeds a threshold.

20. A method as in claim 12 wherein the decoding step includes inverse quantisation and the encoding step includes quantisation of different quantisation step size from that of the inverse quantisation.

21. A method as in claim 12, wherein the step of modifying comprises:

modifying the motion compensation information in accordance with a compression ratio of the two coding schemes.

22. A method as in claim 12 wherein:

the first coding step encodes the signal according to a first resolution, and the second coding scheme encodes the signal according to a second resolution, and scaling the motion compensation information accordingly.

23. A video signal transcoder comprising:

a video signal decoder connected to receive an incoming already encoded video signal, to extract motion compensation data therefrom and to decode the remaining video data in accordance with a first coding scheme;

a video signal encoder connected to receive said decoded remaining video data and to newly encode it in accordance with a second coding scheme; and a multiplexer connected to combine the extracted motion compensation data with the newly encoded remaining video data to provide a transcoded output video signal;

wherein the decoder includes means for extracting motion compensation information from the video signal and a motion compensation information modifier for modifying the motion compensation information in accordance with relative properties of the coding schemes and transferring the motion compensation information to the encoded video signal output from the encoder.

24. A video signal transcoder as in claim 23 further comprising:

means for scaling said extracted motion compensation data before it is output from the transcoder.

25. A video signal transcoder as in claim 23 further comprising:

drift compensation means for generating pixel domain drift data between the signals coded in said first and second coding schemes and for converting said pixel domain data to the frequency domain where it is combined with input to said video signal encoder.

26. A video signal transcoding method comprising:

extracting motion compensation data from an incoming already encoded video signal;

decoding the remaining video data of said incoming video signal in accordance with a first coding scheme;

encoding said remaining video data in accordance with a second coding scheme;

modifying the motion compensation information in accordance with relative properties of the coding schemes; and combining the extracted motion compensation data with the newly encoded remaining video data to provide a transcoded output video signal.

27. A video signal transcoding method as in claim 26 further comprising:

scaling said extracted motion compensation data before it is output.

28. A video signal transcoding method as in claim 26 further comprising:

generating pixel domain drift data between the signals coded in said first and second coding schemes and for converting said pixel domain data to the frequency domain where it is combined with input to said video signal encoding step.

* * * * *